June 14, 1932.  A. DINA  1,863,366
ADJUSTABLE APERTURE FOR MOTION PICTURE PROJECTION MACHINES
Filed Nov. 30, 1928  3 Sheets-Sheet 1
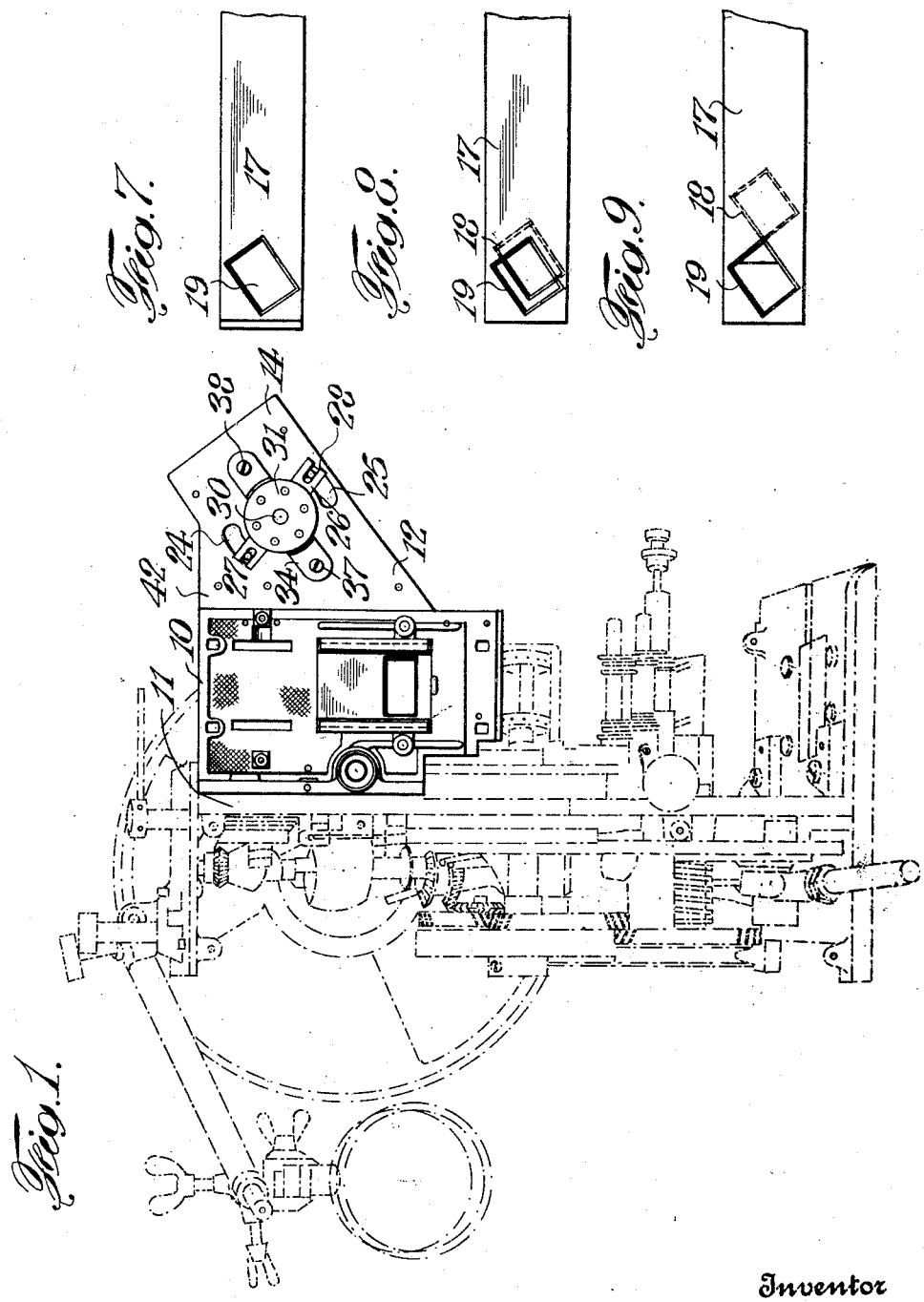

June 14, 1932. A. DINA 1,863,366
ADJUSTABLE APERTURE FOR MOTION PICTURE PROJECTION MACHINES
Filed Nov. 30, 1928  3 Sheets-Sheet 2
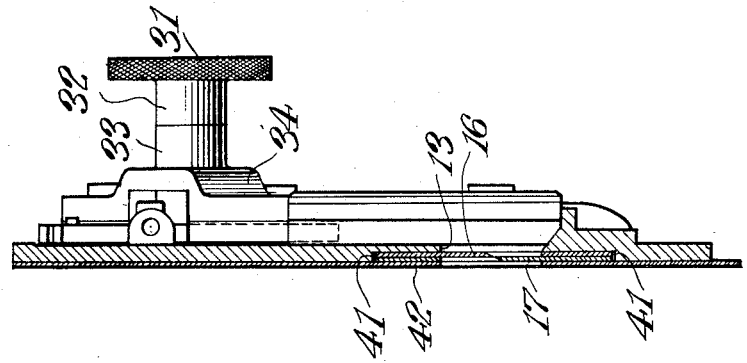
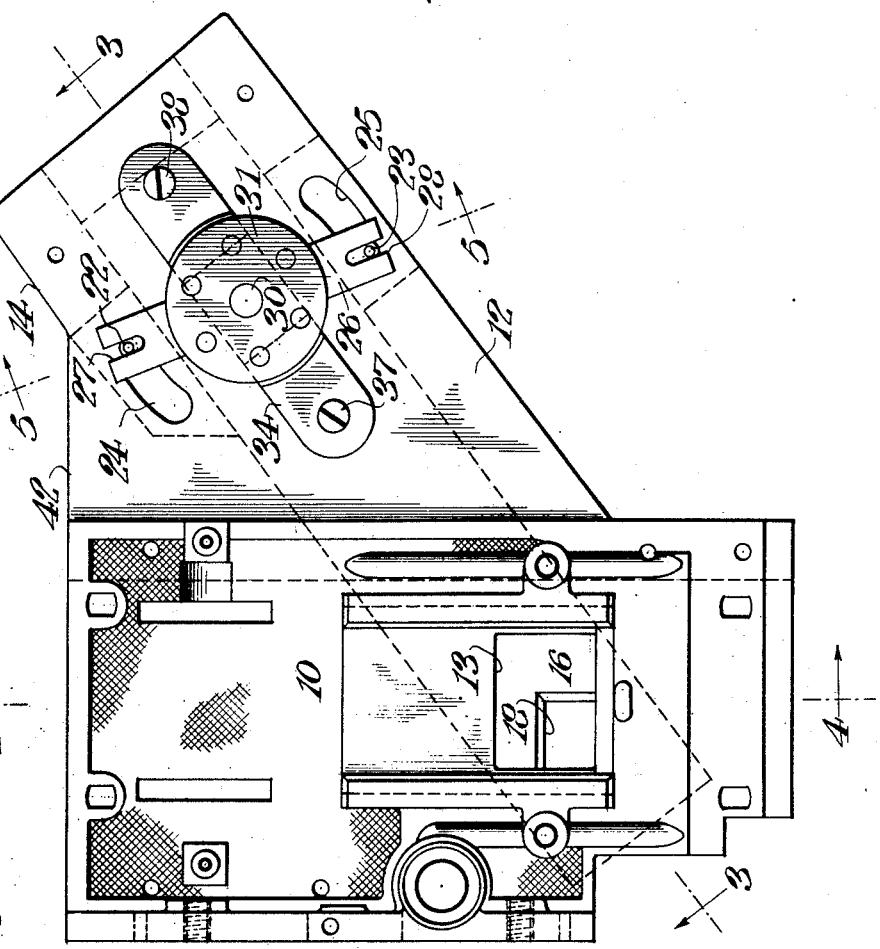
Inventor
Augusto Dina
By his Attorney June 14, 1932. A. DINA 1,863,366
ADJUSTABLE APERTURE FOR MOTION PICTURE PROJECTION MACHINES
Filed Nov. 30, 1928  3 Sheets-Sheet 3
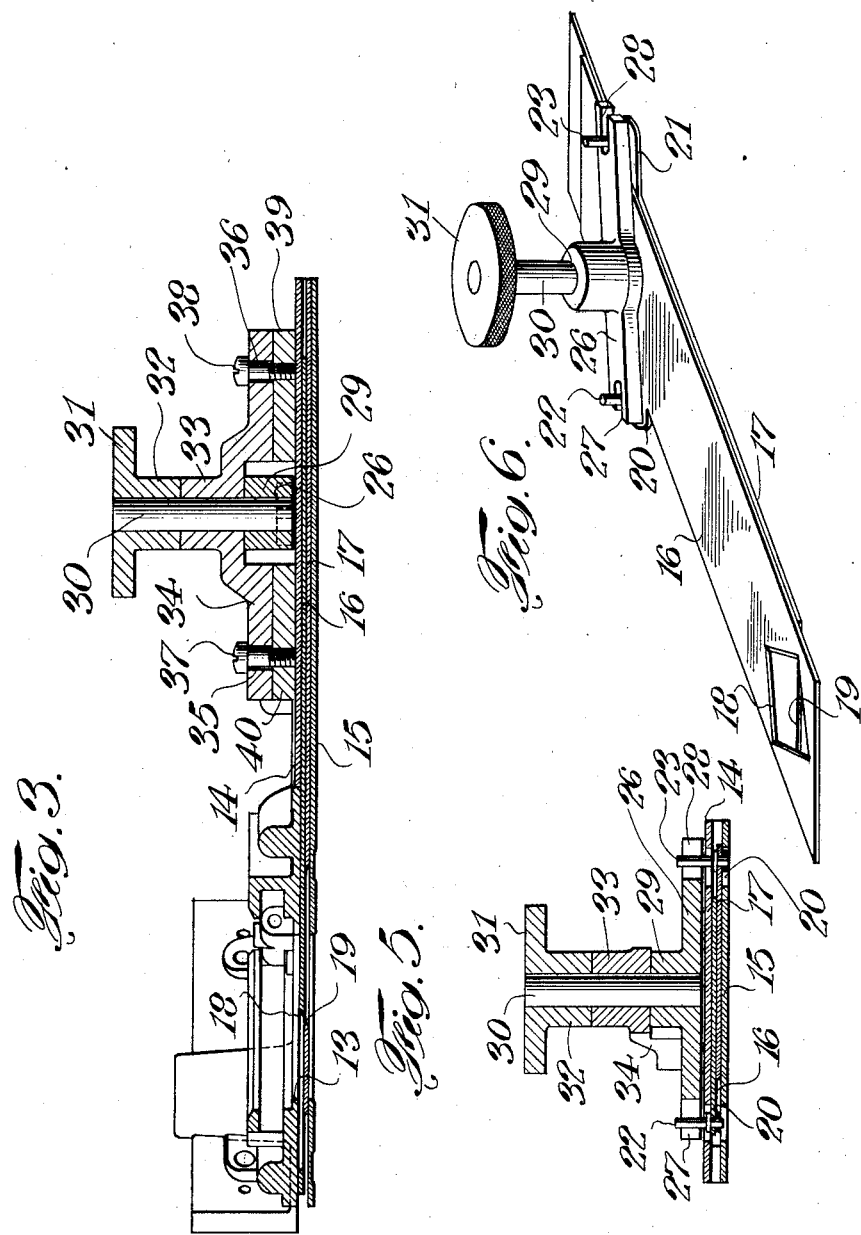
Inventor
Augusto Dina
By his Attorney Patented June 14, 1932

1,863,366

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

ADJUSTABLE APERTURE FOR MOTION PICTURE PROJECTION MACHINES

Application filed November 30, 1928. Serial No. 322,702.

This invention relates to motion picture machines and has particular reference to an improvement in projectors whereby the film aperture opening may be easily, quickly, and accurately controlled and adjusted to adapt the machine for use with several kinds of film now in vogue.

Since the advent of talking moving pictures, and perhaps in other instances, the edges of the film used have been occupied by photographic reproductions of the sound accompanying the successive scenes. Consequently the amount or area of the film occupied by the picture itself on such a film has been reduced and, since the sound striata have generally occupied only one side of the film, the picture portion thereof has been unsymmetrically reduced and consequently would be thrown on the screen in this unsymmetrical manner. Furthermore, unless positive and accurate means are employed to cut down the size of the film aperture so that the portion of the film occupied by the sound striata will not receive light while passing the aperture opening, these striata will be projected on the screen and thus be objectionable.

It is an object of this invention to provide simple and efficient means whereby the size of the film aperture can be adjusted to prevent the incidence of projecting light on the sound striata and the edges of the film, and whereby, in this adjustment, the aperture opening will be adjusted and symmetrically reduced proportionately along all its sides and thus maintain the proper proportion of the picture on the screen.

Further and more specific objects, features, and advantages will more clearly appear from the detailed description given below when taken in connection with the accompanying drawings which form part of the specification, which illustrate one preferred embodiment of the invention, and in which, Fig. 1 is a rear elevation of the projection head, showing in full lines the part thereof which has to do with this invention.

Fig. 2 is an enlarged elevation of the full-line portion of Fig. 1,

Fig. 3 is a longitudinal section taken on the line 3—3 of Fig. 2,

Fig. 4 is a vertical section taken on the line 4—4 of Fig. 2,

Fig. 5 is a cross section taken on the line 5—5 of Fig. 2,

Fig. 6 is a perspective view of the sliding shutter plates and their cooperating member, Fig. 7 is a diagrammatic view of the shutter plates in their relative positions for full aperture, Fig. 8 is a similar view of the plates set for a reduced aperture, and, Fig. 9 is a similar view of the plates set for a closed aperture.

What is now considered the preferred form of the improvement is associated with a projector shown in dotted lines in Fig. 1 and is particularly related to the plate 10 which is transversely mounted on the vertical frame member 11 of the machine. This plate 10 is provided with the usual film aperture across which the film passes and through which the light from the arc projects to pass through the film on its way to the screen. In using the ordinary film, the picture section of it fills the film aperture, but if a talking-moving picture film is to be employed, part of the aperture is occupied by that portion of the film carrying the sound striata and it becomes necessary to cut off that portion of the aperture so that the projecting light will not be incident thereon. If only this portion of the aperture were cut off, the aperture would become unsymmetrical and so would the light frame thrown on the screen. In order to prevent this occurrence, it often becomes desirable to cut off or reduce the film aperture on all four sides in the same degree.

To this end there is provided a pair of what is termed iris plates slidable with respect to each other and disposed in a plane parallel to and closely adjacent that of the film aperture. Each iris plate has an opening therein of the same size as the film aperture opening and when the plates are in one relative position, these openings are aligned in exact registration so that the film aperture is full size.

To effect the fine and proportional reduction in the size of the film aperture opening, it is necessary that each side of the aperture be reduced by the same amount as the others. Therefore it becomes necessary that the longitudinal axis of the sliding plates, the diagonal of the film aperture, and the diagonals of the openings in the iris plates, coincide and that the diagonals of the openings as they are moved will proceed along the line of the film aperture diagonal or an extension thereof. It will therefore be seen that when this action takes place, the film aperture may be reduced to nothing or expanded to full size and still maintain at any size the same proportion of opening.

With reference to the specific form of the invention, there is attached at the side of the plate or head 10 a frame 12. This frame preferably extends laterally in a plane closely adjacent that of the film aperture opening 13. This frame, which will be termed the iris frame, is preferably formed of spaced plates 14 and 15 between which are suitably disposed sliding iris plates 16 and 17. Near adjacent ends, these plates 16 and 17 are provided with rectangular openings 18 and 19 arranged so that their diagonals are coincident with the longitudinal axis of the iris plates 16 and 17. These iris plates 16 and 17 are disposed at such an angle to the plate 10 that the longitudinal axis of the iris frame coincides with the diagonal of the film aperture opening 13.

Along opposite sides, at their other ends, these iris plates 16 and 17 are respectively provided with outwardly extending ears 20 and 21 from which pins 22 and 23 project upwardly through slots 24 and 25 in the top plate 14 of the iris frame 12. An operating arm 26 is provided in its opposite ends with openings such as slots 27 and 28 through which the pins 22 and 23 project and by which they are moved to effect the relative movement of the sliding iris plates 16 and 17. The arm 26 has a central outwardly extending hub 29 to which a stub shaft 30 is connected. This shaft is, on its outer end, provided with an operating knob 31. This knob 31 has a dependent hub 32 resting on a hub 33 formed on the upper face of a cap plate 34. This cap plate 34 is provided with openings 35 and 36 through which screws 37 and 38 pass and are fastened to base plates 39 and 40 mounted on the top plate 14 of the iris frame 12. The base plates 39 and 40 are spaced apart a sufficient distance to permit of the oscillation of the operating arm 26 and the center of the cap plate 34 is elevated to permit of the housing therebeneath of the hub 29.

The back of the head plate 10 supporting the film aperture opening 13 is cut away to form a diagonal slot 41 in which the lower ends of the iris plates are adapted to slide. This slot is covered by a plate 42 except where the film aperture is disposed to hold the iris plates in position in the slot 41. This cover plate is really an extension of one of the spaced plates 15 of the iris frame 12, and is suitably connected to the back of the plate 10 to hold the assembly together. The axis of the slot 41 is coincident with the diagonal of the film aperture and consequently as the iris plates are moved relative to each other they are moved along the diagonal of the film aperture.

In Fig. 7 there is shown the iris plates in the position in which the two openings 18 and 19 are in full registration with each other. It will be seen that in this position the opening thus formed is of the same form and size as that of the film aperture opening 13. Now, by turning the knob 31, the arm 26 is oscillated to slide the plates 16 and 17 and vary the relative position of these plates. Thus in Fig. 8 these plates will be seen in the position to which they have been moved to considerably reduce the film aperture. Nevertheless it will be observed that the general proportions of the aperture are preserved. This is of course due to the fact that the diagonal movement of the plates is along the diagonal of the film aperture, and also to the fact that the diagonals of the openings 18 and 19 are along the longitudinal central axis of the plates 16 and 17. In Fig. 9 the plates have been moved to the position where the full aperture is entirely closed.

It will thus be perceived that the device is simple, compact, and easily operated to produce any size film aperture which is always proportional to the full size opening. The aperture may be adjusted even while the machine is in operation so that if a film is employed which is partly taken up with talking moving pictures and partly with ordinary pictures the adjustment may be made accordingly.

While my improvement has been described in detail and with respect to a preferred form thereof, it is not desired that it be limited to such details and form since many changes and modifications may be made and the invention embodied in other forms without departing from the spirit and scope of the invention in its broader aspects. Hence it is desired to cover all modifications and forms coming within the language or scope of any one or more of the appended claims.

What is claimed, is:

1. A motion picture machine having a film aperture, a frame adjacent thereto, said machine and frame having aligned passages, a pair of apertured slidable plates disposed in said frame and movable in said passages with regard to said film aperture, a rotatable knob on said frame, arms extending oppositely from said knob and having slots therein, and pins on the plates adapted to project into the respective slots whereby the turning of the knob will slide the plates in opposite directions.

2. A motion picture machine having a film aperture, a frame adjacent thereto, said frame and machine having aligned passages, a pair of apertured slidable plates disposed in said passages and movable with regard to the film aperture, said frame comprising a pair of spaced plates between which said apertured slidable plates move, a rotatable knob on one of said spaced plates, slotted arms projecting in opposite directions from said knob, the adjacent one of said spaced plates forming said frame having slots therein, the apertured slidable plates having offset ears thereon, pins on said ears projecting through the slots in said spaced plate and adapted at their ends to lie in the slots in said oppositely extending arms, the movement of the knob in one direction or the other tending to move the apertured slidable plates relative to each other in opposite directions.

AUGUSTO DINA.